United States Patent Office 2,933,530
Patented Apr. 19, 1960

2,933,530

METHOD OF PRODUCING QUATERNARY AMMONIUM COMPOUNDS

Teunis Kralt and Jan van Dijk, Weesp, Netherlands, assignors, by mesne assignments, to North American Philips Company, Inc., New York, N.Y., a corporation of Delaware No Drawing. Application October 19, 1956
Serial No. 616,960

Claims priority, application Netherlands November 24, 1955

9 Claims. (Cl. 260—567.6)

The invention relates to a method of producing quaternary ammonium compounds of the general formula:

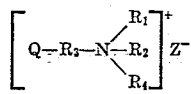

In this formula Q designates a saturated or an unsaturated, aliphatic or mixed aliphatic-alicyclic radical, composed of two isoprene radicals, $R_3$ is a saturated or an unsaturated isopropyl radical and has either of the two following meanings:

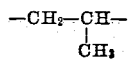

or

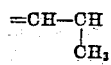

$R_1$, $R_2$, $R_4$ designate an alkyl radical with 1 to 6 carbon atoms, an aralkyl radical or a mixed aliphatic-alicyclic radical. Z is an inorganic anion, for example, a halogen- or $HSO_4$-ion.

The compounds may be produced by methods known per se for the production of quaternary ammonium compounds. Of the compounds of the invention reference may be made to those in which Q—$R_3$ is an $\alpha$-, a $\beta$-, or a $\psi$-ionyl radical or a hydrogenated homologue of one of these radicals, for example, a dihydro-$\beta$-ionyl or a tetrahydro-$\psi$-ionyl radical.

Among the various possible combinations of $R_1$, $R_2$ and $R_4$ especially those may be referred to in which $R_1$ and $R_2$ designate each an alkyl radical with 1 to 6 carbon atoms, for example, a methyl, an ethyl, an isoamyl or a hexyl radical, while $R_4$ is a mixed aliphatic-alicyclic radical, preferably similar to that given for the group of Q—$R_3$, for example a dihydro-$\beta$-ionyl radical or an aralkyl radical, for example a 1-methyl-2-phenylethyl radical.

$R_1$, $R_2$ and $R_4$ may, as an alternative, have the same meaning. Thus, all these radicals may designate alkyl radicals with 1 to 6 carbon atoms, for example, methyl or ethyl radicals.

Z designates preferably a halogen ion, for example, an iodine ion or a bromine ion. The primary, secondary and tertiary amines so far described have a spasmolytic activity of a prominent musculotropic nature. The next following monoquaternary ammonium compounds, if tested with respect to barium chloride have, as a spasmogen, an activity which is slightly lower than that of the aforesaid primary, secondary and tertiary amines. Besides, these quaternary ammonium compounds exhibit a greater activity with respect to acetyl choline as a spasmogen, so that these compounds also have a spasmolytic activity of neurotropic nature.

The compounds according to the invention may be produced by causing a primary amine of the general formula $QR_3$—$NH_2$ to react in the presence of lye, for example, caustic soda lye, or potassium lye or lime water and a solvent, for example an aliphatic alcohol, with such a quantity of a halogenating agent of the formula $R_1Z$ that two alkyl radicals are bound to the nitrogen atom, after which the resultant tertiary amine is converted with a halogenating agent into a quaternary ammonium salt. This reaction may be varied by first replacing a hydrogen atom of the primary amine by an alkyl radical and then by using a second alkylating agent. By the use of a third alkylating agent, the third introduced radical may, at will, be rendered different from or equal to one of the radicals already introduced.

The alkylation reaction may be carried out in a suitable manner in the presence of a solvent for the two reaction components. As such use may be made, for example of the lower aliphatic alcohols, such as, methanol, ethanol, propanol, isopropanol or butanol. However, as an alternative, the reaction may be carried out successfully without a solvent.

In the alkylation reaction one or two acid molecules are set free depending on whether the primary amines or the tertiary amines are produced directly or first the secondary amines are produced. In order to obtain a maximum yield of the desired amine, it is advisable to neutralize the acid set free with an equivalent quantity of lye, for example, caustic soda lye or potassium lye. The lye may be added prior to or during the alkylation reaction. If, for example, from dihydro-$\alpha$-ionyl amine the N.N-dimethyl tertiary amine is to be produced without intermediate separation of the N-methyl secondary amine, two equivalent quantities of caustic soda lye or potassium lye may be added directly at the beginning of the reaction. Larger quantities may, of course, be used, but this is not required. However, the alkylation agent may be added to the dihydro-$\alpha$-ionyl amine, if desired in the presence of a solvent and the acid formed may be neutralized after about one equivalent quantity thereof has been produced.

The tertiary amines formed during the alkylation of the primary amines may be converted into the quaternary ammonium salts by alkylating the tertiary amines. This reaction is not carried out in the presence of lye, since during the formation of quaternary ammonium salts no acid is produced. This alkylation may take place both with the aid of a solvent and by directly mixing the reaction components. If a solvent is used it may be advisable to let the reaction mixture remain at room temperature for some time, for example for one hour and to boil it subsequently. If the reaction is carried out without the use of a solvent, it may be desirable to have the quaternary bond produced at a slightly higher temperature, for example, by refluxing the reaction components. It should be noted that the reaction in which primary amines form the starting material is particularly suitable to obtain those compounds in which the radicals $R_1$ and $R_2$ and, if desired, $R_4$ are identical.

Of course, the starting materials may be secondary amines. The reaction conditions required for the production of the quaternary ammonium salts from these secondary amines are substantially identical with those for the production of the compound according to the invention from the primary amines. Thus first the tertiary amines will be produced by alkylation with an alkylating agent in the presence of a lye in order to bind the acid formed. The tertiary amines thus produced may be converted into the quaternary ammonium salts in the same manner as indicated above. As alkylating agents use may, in general, be made of compounds of the formula $R_1Z$, wherein $R_1$ has the meaning described above for $R_1$, $R_2$ and $R_4$, whilst Z designates an inorganic acid radical. These alkylating agents are preferably halides, chlorides, bromides, iodides, for example benzyl chloride, methyl iodide, or -bromide, ethyl iodide or -bromide, 3-methylbutyl-iodide or -bromide, iodine-1 or bromine-1-methyl-2-phenyl-ethane or dihydro-β-ionyl-iodide or -bromide.

As an alkylating agent use may, however, also be made of dialkyl sulphates, for example, dimethyl- or diethyl-sulphate. In such a case Z of the above-mentioned formulae designates an $HSO_4$-ion.

For the production of the quaternary ammonium salts from the corresponding alkylation products of primary or secondary amines, it is advisable to purify first the latter reaction product to a greater or smaller extent, for example, by removing an excess quantity of lye or by distilling off the surplus of alkylating agent or solvent.

EXAMPLE I

N,N,N-tri-ethyl-N-dihydro-β-ionyl ammonium iodide

N,N,N-tri-ethyl-N-{1-methyl-3-(2', 6', 6'-trimethylcyclohexene-1'-yl propyl}ammonium iodide (Formula I)

To a solution of 1.25 gs. of N,N-di-ethyl-dihydro-β-ionyl amine (0.005 mol) in 10 mls. of absolute alcohol there was added 2.4 gs. of ethyl iodide (0.015 mol). This solution was then refluxed for 14 hours and after cooling diluted with 250 mls. of absolute ether. The deposit obtained was sucked off and dried in vacuo. Yield 1.25 gs. Melting point (after recrystallisation from water) 133 to 134° C.

Analysis.—Found 8.38% H, 54.05% C, 32.88% J. Calculated: 9.34% H, 56.02% C, 31.20% J.

EXAMPLE II

N,N-dimethyl-N,N-bis (dihydro-β-ionyl) ammonium iodide

N,N-dimethyl-N,N-bis{1-methyl-3-(2', 6', 6'-trimethyl-cyclohexene-1'-yl)propyl}ammonium iodide (Formula II)

To a solution of 4.1 gs. of bis-(dihydro-β-ionyl) amine (0.011 mol) in 15 mls. of methanol was added 1.8 gs. of methyl iodide (0.013 mol). After this solution had been kept for 24 hours at room temperature, were added in succession: 2.00 mls. of 6.3 $n$ caustic soda, 50 mls. of methanol and 2.3 gs. of methyl iodide and the reaction mixture was boiled for two hours at a reflux cooler. Then again 2.3 gs. of methyl iodide was added and boiling was resumed for two hours. Then the solvent and the surplus of methyl iodide were evaporated in vacuo and the residue was dissolved in 10 mls. of acetone by heating it. The product crystalilzing out after cooling was filtered off and from the filtrate a second crystallisate was obtained. These two crystallisates were recrystallized from water. Yield: 1.0 g. (17%). Melting point 194 to 195° C.

Analysis.—Found: 10.06% H, 62.99% C, 2.64% N, 24.1% J. Calculated: 9.84% H, 63.70% C, 2.65% N, 24.0% J.

EXAMPLE III

N - ethyl - N - methyl - N - phenyl - isopropyl - N - dihydro-β-ionyl-ammonium iodide N - ethyl - N - methyl - N - (1 - methyl - 2 - phenylethyl)- N - {1 - methyl - 3 - (2', 6', 6' - trimethyl - cyclohexene-1'-yl) propyl} ammonium iodide (Formula III)

A mixture of 1.5 gs. of N-ethyl-N-phenyl-isopropyl-dihydro-β-ionyl amine and 11 gs. of methyl iodide were refluxed for three hours and then diluted with 50 mls. of petroleum ether. The oil thus precipitated was separated from the top liquid by decanting the latter, after which it was washed three times with 20 mls. of petroleum ether. All solvents were removed from the precipitated oil by evaporation in vacuo, so that the product became solid. Yield: 1.8 gs.

Analysis.—Found: 8.64% H; 59.98% C; 3.07% N and 26.9% J. Calculated: 8.70% H; 62.11% C; 2.90% N and 26.3% J.

EXAMPLE IV

N,N,N-trimethyl-N-tetrahydro-ψ-ionyl ammonium iodide

N,N,N-trimethyl-N-(1. 5. 9-trimethyl-decene-8-yl) ammonium iodide (Formula IV)

A solution of 7 gs. of N-methyl-tetrahydro-ψ-ionyl amine (0.03 mol) and 17 gs. of methyl iodide in 50 mls. of absolute ethanol was refluxed for two hours, after which 1.7 gs. of potassium hydroxide and again 50 mls. of absolute ethanol were added to the solution. After this mixture had been boiled for one and a half hours, the potassium iodide crystallizing out by cooling and evaporation was removed by filtration. From the reaction mixture obtained by evaporation, after removing the potassium iodide and dissolving in 10 mls. of absolute ethanol, by adding 150 mls. of absolute ether, the impure quaternary compound was precipitated. The deposit was purified by dissolving it in chloroform by filtering the solution and by precipitating the pure compound by means of ether. Yield 6 gs. Melting point 248 to 250° C.

Analysis.—Found: 9.51% H; 51.81% C; 3.71% N; 34.2% J. Calculated: 9.26% H; 52.31% C; 3.81% N; 34.6% J.

EXAMPLE V

N-ethyl-N-isoamyl-N-methyl-N-tetrahydro-ψ-ionyl ammonium iodide

N - ethyl - N - methyl - N - (3 - methylbutyl) - N - (1. 5. 9-trimethyldecene-8-yl) ammonium iodide (Formula V)

A mixture of 6 gs. of N-ethyl-N-isoamyl-tetrahydro-ψ-ionyl amine (0.02 mol) and 6 mls. of methyl iodide (0.1 mol) was boiled for 1.5 hours. Then again 6 mls. of methyl iodide was added and boiling was resumed for 1.5 hours. The reaction mixture was washed five times with quantities of 25 mls. of petroleum ether and from the remaining washed quaternary compound the solvent was evaporated in vacuo, so that the substance became solid.

Yield quantitative. Found 28.9% J (calculated 29.1%).

EXAMPLE VI

N,N,N-trimethyl-dihydro-β-ionyl ammonium iodide

N,N,N-trimethyl-N-{1-methyl-3-(2', 6', 6'-trimethyl-cyclohexene-1'-yl) propyl}ammonium iodide (Formula VI)

A mixture of 2.2 gs. (0.01 mol) of dihydro-β-ionyl amine, 2 mls. (0.032 mol) of methyl iodide and 10 mls. of methanol was boiled for half an hour. To the reaction mixture was then added 2 mls. of 6 $n$ caustic soda. This liquid was boiled again for one hour. The solution had a neutral reaction. After evaporation of the methanol and the surplus of methyl iodide, the residue was dissolved in 5 mls. of acetone. After more than 12 hours the deposit was filtered off and washed with acetone. From the filtrate a new crystallisate was obtained. The yield was 2.7 gs. (70%). After recrystallisation from acetone and then from water the melting point was 221 to 225° C.

Found: 34.6% iodine (calculated 34.8%).

EXAMPLE VII

N-methyl-N-ethyl-N-isoamyl-N-dihydro-β-ionyl ammonium iodide

N-methyl-N-ethyl-N-(3-methylbutyl-N{1-methyl-3-(2', 6', 6'-trimethyl cyclohexene-1'-yl)propyl}ammonium iodide (Formula VII)

A mixture of 0.8 g. (0.0029 mol) of N-methyl-N-isoamyl-dihydro-β-ionyl amine, 1 ml. (0.012 mol) of ethyl iodide and 3 mls. of ethanol were boiled for three hours. After evaporation of the solvent and the surplus of ethyl iodide, 1.26 gs. of oil remained (i.e. 100% of the theoretical value), which did not crystallize.

Found: 30.0% iodine (calculated 29.2%).

EXAMPLE VIII

N - methyl - N-ethyl-N-phenylisopropyl-N-tetrahydro-ψ-ionyl ammonium iodide

N-methyl-N-ethyl-N-(1-methyl-2-phenylethyl)-N-(1, 5, 9-trimethyldecene-8-yl)ammonium iodide (Formula VIII)

A mixture of 1.75 gs. of N-ethyl-N-phenyl-isopropyl-tetrahydro-ψ-ionyl amine and 10 gs. of methyl iodide was boiled for three hours.

Then to the solution was added 50 mls. of petroleum ether. A solid oil was produced, which was washed a few times with petroleum ether. Finally the solvent was evaporated in vacuo. The yield was quantitative.

Analysis.—Iodine content 26.0% (calculated 26.2%).

FORMULA I

Quaternary ammonium compounds

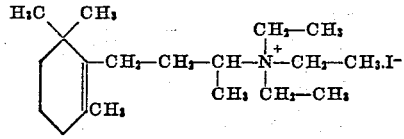

FORMULA II

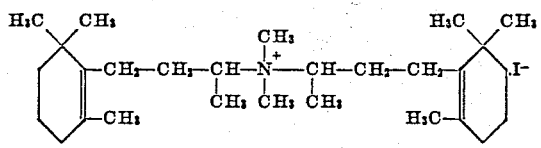

FORMULA III

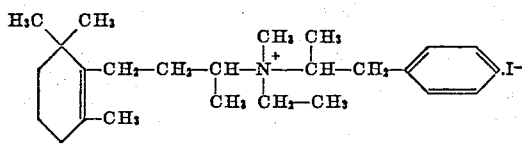

FORMULA IV

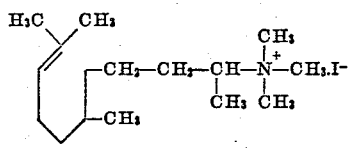

FORMULA V

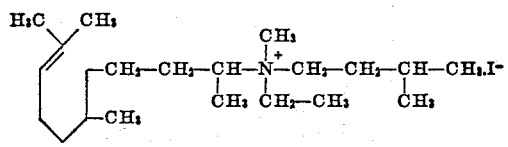

FORMULA VI

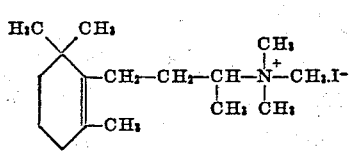

FORMULA VII

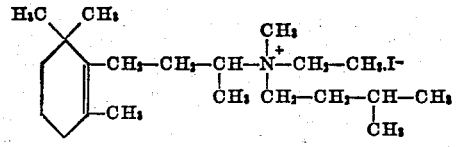

FORMULA VIII

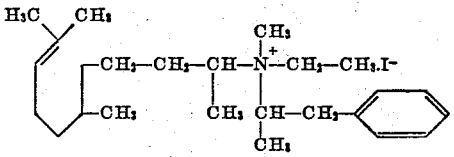

What is claimed is.

1. Quaternary ammonium compounds corresponding to the general formula:

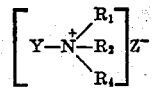

wherein Y is a radical selected from the group consisting of the α ionyl, the β ionyl, the γ ionyl, the dihydro-β-ionyl and the tetrahydro-γ-ionyl radicals, $R_1$, $R_2$ and $R_4$ are each independently radicals selected from the group consisting of alkyl radicals containing from 1 to 6 carbon atoms, the α ionyl, the β ionyl, the γ ionyl, the dihydro-β-ionyl and the tetrahydro-γ-ionyl radicals and the 1-methyl-2-phenylethyl radical and Z is an inorganic anion selected from the group consisting of halide ions and the $HSO_4$-ion.

2. N,N,N - triethyl,N-[1-methyl-3-(2',6',6'-trimethyl-cyclohexene-1'-yl)propyl]ammonium iodide.

3. N,N - dimethyl,N,N - bis[1 - methyl-3-(2',6',6'-tri-methylcyclohexene-1'-yl)propyl]ammonium iodide.

4. N - ethyl,N - methyl,N-(1-methyl-2-phenylethyl),N-[1 - methyl-3(2',6',6'-trimethyl-cyclohexene-1'-yl)propyl] ammonium iodide.

5. N,N,N - trimethyl,N - (1,5,9-trimethyl-decene-8-yl) ammonium iodide.

6. N - ethyl,N-methyl,N-(3-methylbutyl),N-(1,5,9-tri-methyldecene-8-yl)ammonium iodide.

7. N,N,N - trimethyl,N-[1-methyl-3-(2',6',6'-trimethyl-cyclohexene-1'-yl)propyl]ammonium iodide.

8. N - methyl,N-ethyl,N-(3-methylbutyl),N-[1-methyl-3-(2',6',6'-trimethyl cyclohexene-1'-yl)propyl]ammonium iodide.

9. N - methyl,N - ethyl,N-(1-methyl-2-phenylethyl),N-(1,5,9-trimethyldecene-8-yl)ammonium iodide.

References Cited in the file of this patent

UNITED STATES PATENTS

| | | | |
|---|---|---|---|
| 2,230,752 | Klavehn et al. | Feb. 4, | 1941 |
| 2,230,753 | Klavehn et al. | Feb. 4, | 1941 |
| 2,483,381 | Goldberg et al. | Sept. 27, | 1949 |
| 2,483,382 | Goldberg et al. | Sept. 27, | 1949 |
| 2,647,122 | Archer et al. | July 28, | 1953 |
| 2,692,285 | Robinson | Oct. 19, | 1954 |
| 2,736,746 | Goldberg et al. | Feb. 28, | 1956 |
| 2,775,617 | Shapiro et al. | Dec. 25, | 1956 |

FOREIGN PATENTS

| | | | |
|---|---|---|---|
| 677,197 | Great Britain | Aug. 13, | 1952 |

OTHER REFERENCES

Blicke et al.: J.A.C.S., vol. 61, pp. 91–95 and 771–776 (1939).

Kulz et al.: Berichte der deut. chem. Ges., vol. 72, pp. 19–28 and 2161–2167 (1939).